United States Patent [19]

Narishige et al.

[11] Patent Number: 4,516,180
[45] Date of Patent: May 7, 1985

[54] THIN FILM MAGNETIC HEAD

[75] Inventors: Shinji Narishige; Tsuneo Yoshinari, both of Hitachi; Mituo Sato, Takahagi; Masayuki Takagi, Odawara; Toshihiro Yoshida, Fujisawa, all of Japan

[73] Assignee: Computer Basic Technology Research Assoc., Tokyo, Japan

[21] Appl. No.: 378,176

[22] Filed: May 14, 1982

[30] Foreign Application Priority Data

May 15, 1981 [JP] Japan .................................. 56-72327

[51] Int. Cl.$^3$ .............................................. G11B 5/16
[52] U.S. Cl. ..................................................... 360/126
[58] Field of Search ......................... 360/126, 127, 123

[56] References Cited

U.S. PATENT DOCUMENTS 3,908,194  9/1975  Romankiw ........................... 360/113

FOREIGN PATENT DOCUMENTS 0042352  3/1980  Japan .................................. 360/126

OTHER PUBLICATIONS

Lazzari et al., "Integrated Magnetic Recording Heads", IEEE Trans. on Magnetics, vol. MAG-7, No. 1, Mar. 1971, p. 146.
Romankiw et al., "Design . . . Heads", IBM Tech. Disc. Bull., vol. 23, No. 5, Oct. 1980, p. 2148.
Feng et al., "Laminated . . . Material", IBM Tech. Disc. Bull., vol. 21, No. 11, Apr. 1979, p. 4367.

Primary Examiner—Robert S. Tupper
Attorney, Agent, or Firm—Antonelli, Terry & Wands

[57] ABSTRACT

A thin film magnetic head comprises an upper magnetic film and a lower magnetic film which cooperate to constitute a magnetic circuit including a magnetic gap, and a coil conductor film constituting a coil having a predetermined number of turns and extending between the upper and the lower magnetic films to intersect the magnetic circuit. The upper magnetic film is composed of a laminate constituted by magnetic thin film layers and non-magnetic thin film layers stacked alternately with each other. An electrically insulating layer formed of a photo-sensitive resin is interposed between the upper magnetic film and the coil conductor film.

18 Claims, 7 Drawing Figures

THIN FILM MAGNETIC HEAD

BACKGROUND OF THE INVENTION

The present invention relates to a thin film magnetic head adapted for use with a magnetic drum, tape or disc equipment for an electronic computer system.

The thin film magnetic head of the kind mentioned above is realized by resorting to the thin film techniques for increasing the density of magnetic recording on the magnetic drum, magnetic tape and magnetic disc and usually composed of a lower magnetic film, an upper magnetic film cooperating with the lower magnetic film to constitute a magnetic circuit provided with a magnetic gap and a coil conductor film extending between the upper magnetic film and the lower magnetic film so as to intersect the magnetic circuit, these films being implemented in a laminate structure on a substrate with electrically insulating films being interposed at regions where they are required. In some applications, a portion or the whole of the substrate may be made of a magnetic material so as to serve also as the lower magnetic film.

As important problems to be solved in this type of the thin film magnetic head, the following two may be mentioned: (a) miniaturization of the thin film magnetic head and improvement on magnetic characteristics of the head such as reduction in energy or power required in write operation and increasing of sensitivity of the head in read operation; and (b) realization of the head structure with high precision through facilitated manufacturing processes.

One of methods of dealing with the two problems mentioned above resides in the use of a photo-sensitive resin for an electrically insulating layer which is interposed between the upper magnetic film and the lower magnetic film. According to this method, gaps formed between the individual turns of the coil constituted by the coil conductor film are filled with the resin material, as the result of which the upper surface of the insulating layer located above the coil conductor film is flattened without unevenness or roughness to thereby allow the upper magnetic film to be flately formed over the insulating layer. With this structure, permeability of the thin film magnetic head can be increased signficantly as compared with the magnetic head suffering the roughness. Further, the method mentioned above makes it unnecessary to use an etching mask in contrast to other methods which require the etching mask for performing the photoetching of the insulating film, whereby the insulating film can be formed with a high pattern precision or accuracy, reducing unevenness in precision among the products.

On the other hand, the insulating film or layer formed of the photo-sensitive resin suffers a shortcoming in that the high-temperature withstanding capability is poor as compared with the insulating layer formed of an inorganic material such as $SiO_2$, $Al_2O_3$ or the like and the one formed of a resin of polyimide resin series which exhibits a sufficiently high resistance to a high temperature. Thus, the method of forming the upper magnetic film on the insulating layer is disadvantageously restricted to the process in which any appreciable increasing in temperature is not encountered in forming the upper magnetic film. The reason may be explained as follows.

As a method of forming the magnetic film which is not accompanied with any substantial increase in temperature, a plating process may be mentioned. However, the plating method is disadvantageous in that composition of the magnetic film undergoes remarkable variations even when slight changes occur in the plating conditions, involving thus a great difficulty in manufacturing the magnetic film having desired magnetic characteristics with a satisfactory reproductivity. Besides, it is difficult to control the distribution of film thickness so that the magnetic film of a uniform thickness be obtained. Further, equipment for processing exhaust liquid resulted from the plating process has to be installed, to another disadvantage.

There may be conceived an evaporation process or a sputtering process for the other method which is capable of forming the magnetic film without giving rise to the increasing in temperature. However, when the upper magnetic film having a required thickness in a range of 1 $\mu$m to 8 $\mu$m is formed with the temperature of the substrate being held at a sufficiently low level so as not to exert any adverse influence to the insulating layer, then the magnetic film is converted to the film exhibiting a vertical magnetic anisotropy having an easy axis of magnetization in the thicknesswise direction of the film owing to an internal stress, whereby the permeability is remarkably reduced down to 300 or less. The magnetic head formed of this kind of the magnetic film requires an increased power for write operation while the sensitivity of the head in read operation is degraded to such a degree that the magnetic head can no more be used for practical applications.

As will be appreciated from the foregoing, the thin film magnetic head in which the light-sensitive resin is used as the insulating film or layer suffers many difficult problems which remain to be solved.

SUMMARY OF THE INVENTION

An object of the present invention is to provide an improved thin film magnetic head which can enjoy excellent magnetic characteristics.

Another object of the present invention is to provide a thin film magnetic head which can assure a high pattern precision or accuracy for fabrication.

A further object of the present invention is to provide an improved thin film magnetic head which makes it possible to use a photo-sensitive resin for forming an electrically insulating film or layer.

According to a feature of the present invention, there is provided a thin film magnetic head which comprises an electrically insulating film or layer interposed between a lower magnetic film and an upper magnetic film and in which at least the upper magnetic film is constituted by a laminate composed of magnetic thin film layers and non-magnetic thin film layers stacked alternately with each other. With the laminate structure of the magnetic film as mentioned above, the internal stress is reduced in inverse proportion to the number of the laminated or stacked layers, i.e. in inverse proportion to the thickness of the magnetic film. Accordingly, the magnetic film formed through an evaporation or sputtering process at a low substrate temperature will not be converted to the film exhibiting the vertical magnetic anisotropy, whereby a magnetic film having a high permeability can be obtained. Thus, the thin film magnetic head in which the photo-sensitive resin material is used for forming the insulating layer can be realized in a facilitated manner. It has been experimentally ascertained that the film thickness of the magnetic film which allows the magnetic thin film to be realized with a satisfactory reproductivity through evaporation or sputtering at a low substrate temperature without imparting the vertical magnetic anisotropy to the film and without exterting adverse influence to the light-sensitive layer was found to be about 0.8 μm at the most. The non-magnetic thin film layer may be made of oxide such as $Al_2O_3$ and $SiO_2$, nitride such as $Si_3N_4$ or fluoride such as $MgF_2$. In this connection, it is not desirable to use metals for forming the non-magnetic thin film layers, because otherwise permeability at a high frequency would be decreased due to eddy current effect of increased significance, while mutual diffusion may be caused to occur between the magnetic thin film layers and the non-magnetic thin film layers at increased temperatures encountered in the manufacturing process or during operation of the magnetic head, involving additional reduction in permeability. Further, the thickness of the non-magnetic thin film layer should be selected as small as possible within a range in which the magnetic thin film layers are separated from each other by the interposed non-magnetic thin film layer to such a degree that internal stresses possibly produced in the individual magnetic thin film layers are positively prevented from being combined additively. Numerically, the thickness of the non-magnetic thin film layer should preferably be in a range of 20 Å to 0.04 μm.

The features described above concern the upper magnetic film. However, it will be appreciated that same holds true for the lower magnetic film.

DESCRIPTION OF THE PREFERRED EMBODIMENTS

Figure 1:
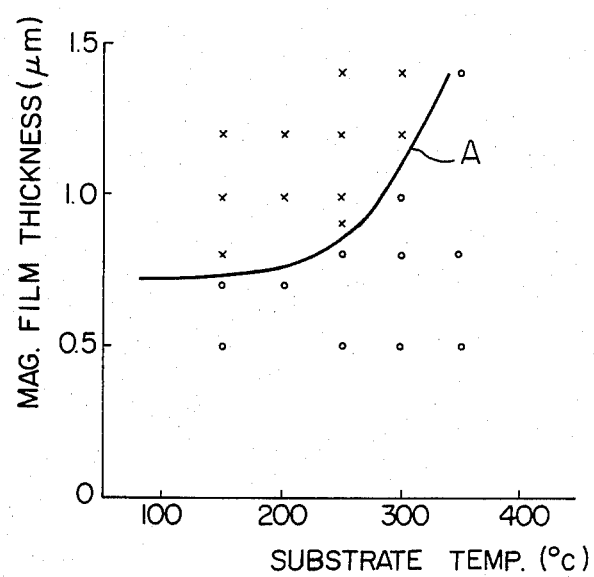
FIG. 1 graphically illustrates a relationship between substrate temperature and thickness of a magnetic thin film layer in a thin film magnetic head which incorporates a magnetic film of 1 to 8 μm thick constituted by a plurality of laminated or stacked magnetic thin film layers.

FIG. 1 graphically shows a relationship between thickness of a single magnetic thin film layer and substrate temperature during sputtering as depicted on the basis of results of experimental measurements performed by the inventors on thin film magnetic heads incorporating magnetic films (78–84% Ni-Fe) having thicknesses in a range of 1 μm to 8 μm. In FIG. 1, symbols x represent occurrences of formations of magnetic thin film exhibiting a vertical anisotropy while symbols O represent formations of magnetic thin films exhibiting a uniaxial anisotropy. Here, uniaxial anisotropy film is a film having an easy axis of magnetization lying in the plane of the film. The hard axes of magnetization are perpendicular to the easy axis. The magnetic permeability along the hard axis perpendicular to the film surface may be about 2,000 to 3,000. Sputtering deposition in a magnetic field can produce a magnetic film having the easy axis of magnetization aligned parallel to the magnetic field. On the other hand, vertical anisotropy film has an easy axis of magnetization perpendicular to the film surface. The magnetic permeability along the film surface (hard axis of magnetization) may be below 300. A curve A represents a boundary between a range in which the magnetic thin films having the vertical magnetic anisotropy are produced and a range in which the magnetic thin films exhibiting the uniaxial magnetic anisotropy are produced. As can be seen from the figure, whether the film exhibiting the vertical anisotropy or the uniaxial anisotropy is produced is definitely determined in dependence on the thickness of the single magnetic thin film layer, so long as the temperature of the substrate is low. Further, it will be seen that the thickness of the thin film layer which allows creation of the thin film layer having the magnetic uniaxial anisotropy is progressively increased as the temperature of the substrate becomes higher. The temperature at which deformation or peel-off of the photo-sensitive resin layer takes place is in a range of 250° C. to 260° C. or more. Accordingly, the temperature at which the magnetic film is formed on the photo-sensitive resin layer has to be selected lower than the temperature on the order of 250° C. Under the condition, the maximum thickness of the magnetic thin film layer at which the film exhibiting the uniaxial magnetic anisotropy is about 0.8 μm, as will be seen from FIG. 1. It is thus required to select the thickness of the magnetic thin film layer equal to or smaller than about 0.8 μm, in order that the magnetic thin film layer be formed on the photo-sensitive resin layer by sputtering without exerting adverse influence to the resin layer. Although the data shown in FIG. 1 is obtained from the measurements on the magnetic films formed by sputtering, it is ascertained that similar results are obtained when the magnetic films are formed through evaporating process. In the exemplary embodiments described below, the magnetic film of a laminated structure is realized in consideration of the results of the measurement illustrated in FIG. 1.

Figure 2:
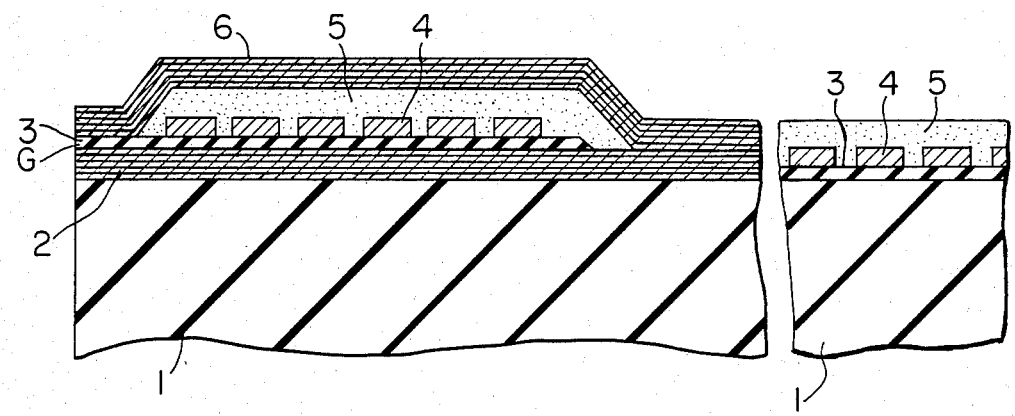
FIG. 2 shows in a schematic sectional view a thin film magnetic head according to an exemplary embodiment of the invention.
Figure 3:
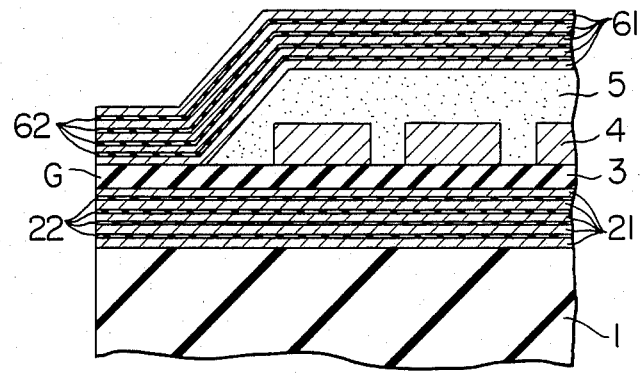
FIG. 3 is a partial enlarged view of FIG. 2.

Referring to FIG. 2 which shows a thin film magnetic head according to an exemplary embodiment of the invention in a sectional view, a reference numeral 1 denotes a non-magnetic substrate made of ceramics, 2 denotes a lower magnetic film which is constituted by a laminate structure of magnetic thin film layers 21 stacked alternately with non-magnetic thin film layers 22 (see FIG. 3) on a major surface of the substrate, 3 denotes a first non-magnetic and electrically insulating layer of alumina formed on a selected surface of the lower magnetic film 2 and including an area where a magnetic gap G is to be formed, 4 denotes a coil conductor film having a portion deposited on the surface of the first non-magnetic and electrically insulating layer 3 except for the area where the magnetic gap G is to be formed while the remaining portion of the coil conductor film is deposited on the insulating film 3 directly formed on the substrate 1, the coil conductor films forming a predetermined number of turns, and 5 denotes a second non-magnetic and electrically insulating layer formed of a photo-sensitive resin and covering selected portions of the first non-magnetic and electrically insulating layer 3 as well as the coil conductor film 4. Here, it is to be noted that the use of laminate structure allows the use of non-magnetic thin film and reduction of each magnetic film constituting the magnetic path. The non-magnetic thin film may be formed of insulator or conductor (metal). The magnetic gap is formed of a non-magnetic material. The conductor film is formed of an electrically conducting material. The remaining part may be formed of electrically insulating material. A reference numeral 6 designates an upper magnetic film which is formed on the second non-magnetic and electrically insulating film 5 at a portion corresponding to the lower magnetic film and has one end portion located in opposition to one end portion of the lower magnetic film 2 with the first electrically insulating layer 3 being interposed, to thereby define the magnetic gap G. The other end portion of the upper magnetic film 6 is brought into contact with the other end portion of the lower magnetic film 2 for forming a magnetic circuit in cooperation with the lower magnetic film 2. The upper magnetic film 6 is also realized in a laminate structure in which magnetic thin film layers 61 are laminated or stacked alternately with non-magnetic thin film layers 62 in a similar manner to the lower magnetic film 2. In the case of the illustrated embodiment, the lower magnetic film 2 is constituted by five magnetic thin film layers 21 formed of Permalloy and four non-magnetic thin film layers 22 of alumina in the alternately laminated structure. Similarly, the upper magnetic film 6 is constituted by five magnetic thin films 61 of Permalloy and four non-magnetic thin film layers 62 of alumina.

The thin film magnetic head of the structure described above can be manufactured through the procedures mentioned below.

At first, the substrate 1 having a major surface polished to a predetermined surface roughness is prepared. Subsequently, the magnetic thin film layer 21 and the non-magnetic thin film layer 22 are alternately formed in the laminate structure on the major surface of the substrate 1 through a magnetron type high rate sputtering process in a magnetic field, as will be described in more detail hereinafter. In the thin film magnetic head actually realized according to the invention, each of the magnetic thin film layers 21 was formed of Permalloy of 80% of Ni-20% of Fe with the layer thickness being 0.4 $\mu$m, while each of the non-magnetic thin film layers 22 was made of alumina in thickness of 0.04 $\mu$m. Five magnetic thin film layers were stacked in alternation with four non-magnetic thin films each being interposed between the adjacent magnetic thin film layers. Thus, the finished laminate film 2 presented the overall thickness of 2.16 $\mu$m. This laminate film structure was selectively removed to thereby form the lower magnetic laminate film 2 of a desired pattern through an ion milling or sputter etching process by using a mask formed of a film of photo-sensitive resin such as photo resist AZ 1350 J commercially available from SHIPLEY Co. in U.S.A. Next, an alumina layer is formed on the lower magnetic laminate film 2 by sputtering. Subsequently, the alumina layer is selectively removed by a dry-etching process so that a selected portion including a region where the magnetic gap is to be formed remains unremoved, to thereby form the first insulating layer 3 in a predetermined pattern. Next, a metal layer including a first thin film layer of Ti or Cr and a second overlying thin film layer of Cu is formed over the first insulating layer 3 and the exposed portions of the one major surface of the substrate 1 through vacuum evaporation or sputtering. This metal layer is patterned in a predetermined coil configuration by a chemical etching or dry etching, to thereby form the coil conductor film 4. The photo-sensitive resin such as AZ 1350 J mentioned above is applied over the coil conductor film 4, the first insulating layer 3 and the lower magnetic laminate film 2 to be patterned in a predetermined form, which is followed by a baking process in vacuum to thereby form the second insulating layer 5. Slanted end portions of the second insulating layer 5 are formed by the flow of the photo-sensitive resin softened during the baking in vacuum. This baking process is also effective to enhance the surface flatness of the second insulating layer 5 except for the end portions thereof. Next, the upper magnetic laminate film 6 is formed in the manner similar to the formation of the lower magnetic laminate film 2. In this connection, it should be noted that the temperature $T_1$ used in the baking process for forming the second insulating film 5 provides an important factor for determining the temperature to which the substrate is subjected upon forming the upper magnetic laminate film 6. More specifically, the temperature $T_2$ of the substrate at a time point immediately before the magnetron type high rate sputtering in the magnetic field should satisfy the condition that $T_2 < T_1 - \Delta T$, where $\Delta T$ represents an increase in temperature of the substrate during the sputtering, in order to prevent the second insulating layer 5 from being delaminated. Further, when the substrate temperature $T_2$ is higher than about 80° C., the permeability of the upper magnetic laminate film is in a range of 2000 to 3000 at an operation frequency of 50 MHz, involving no problems in operation of the thin film magnetic head. To this end, a magnetron type high rate sputtering process should preferably be adopted for the sputtering employed in forming the upper magnetic laminate film, since the increase in temperature of the substrate due to the sputtering can then be made smaller. The temperature increase of the substrate brought about the magnetron type high rate sputtering will vary in dependence on the actual sputtering condition. It has been ascertained that the temperature increase $\Delta T$ of the substrate brought about by the sputtering should be so selected as to be about 80° C. in order to obtain an adequate permeability for the upper magnetic laminate film.

In general, a high permeability at a high frequency is required for the magnetic film of the thin film magnetic head. To meet the requirement, it is desirable that the magnetic film exhibits the uniaxial magnetic anisotropy. As a means for imparting the uniaxial magnetic anisotropy, the sputtering in a magnetic field may be employed in which a magnetic field is established along the surface of the substrate, i.e. in the plane of the deposited film, separate from the magnetic field above the target produced by the magnet disposed below the target for achieving magnetron type high rate sputtering. The magnetic field established along the substrate surface may be produced by means of Helmholtz coils disposed outside the vacuum chamber. As an alternative, permanent magnets may be disposed within the vacuum chamber in such a disposition that a magnetic field is produced along the substrate surface.

In the thin film magnetic head thus manufactured and having the structure shown in FIG. 2, the flatness of the coil conductor film 4 and hence that of the upper magnetic laminate film 6 are improved by virtue of the fact that the second insulating layer 5 is formed of the photo-sensitive resin, whereby a high permeability can be obtained. Further, the laminate structure of the lower and the upper magnetic films 2 and 6 constituted by alternate disposition of the magnetic thin film layers exhibiting the uniaxial magnetic anisotropy and the non-magnetic thin film layers can assure improved magnetic characteristics of the thin film magnetic head. Further, since these magnetic laminate films can be realized with a high pattern precision, unevenness in the precision of the products can be significantly diminished. For example, unevenness in the write current and the read voltage can be reduced to about ⅓ as compared with those of the thin film magnetic head fabricated through a plating process. On the other hand, the write current and the read voltage are equivalent to those of the thin film magnetic head whose magnetic films are realized by the plating process.

Figure 4:
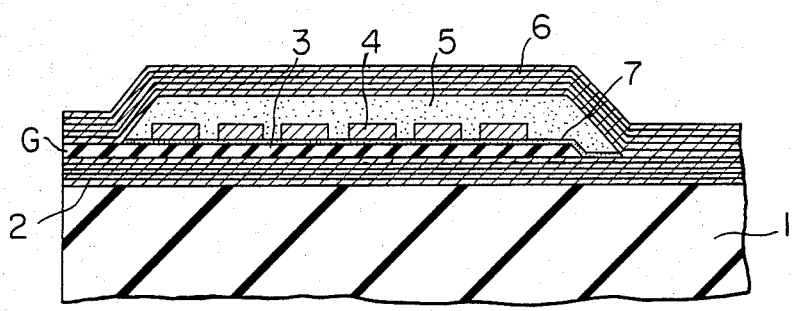
FIG. 4 shows in a schematic sectional view still another embodiment of the thin film magnetic head according to the invention.

FIG. 4 shows another exemplary embodiment of the thin film magnetic head according to the invention which differs from the one shown in FIG. 2 in that a third insulating layer 7 is interposed between the first insulating layer 3 and the coil conductor layer 4. The third insulating layer 7 may be made of the same photo-sensitive material as that of the second electrically insulating layer 5 or other organic material. With the structure of the thin film magnetic head shown in FIG. 4, it is possible to eliminate or reduce by virtue of the presence of the insulating layer 7 the offsets possibly existing between the substrate 1 and the lower magnetic laminate film 2 on one hand and between the lower magnetic laminate film 2 and the first insulating layer 3 on the other hand, whereby the breakage of the coil conductor layer 4 can be positively excluded, to an advantageous effect in addition to those obtained in the thin film magnetic head structure shown in FIG. 2. The structure in which the third insulating layer 7 is interposed between the first insulating layer 3 and the coil conductor film 4 can be adopted in other exemplary embodiments of the invention described below, if desired.

Figure 5:
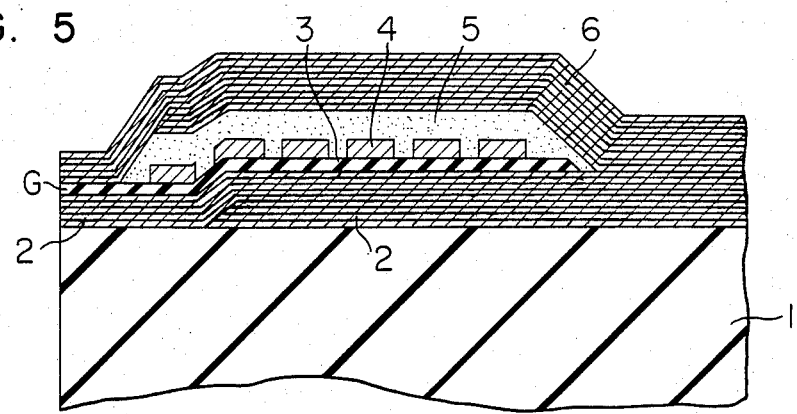
FIG. 5 shows in a schematic sectional view a further embodiment of the thin film magnetic head according to the invention.

FIG. 5 shows another exemplary embodiment of the thin film magnetic head according to the present invention which differs from the preceding ones in that the upper and the lower magnetic laminate films 6 and 2 are increased in thickness at locations distanced from the magnetic gap G, respectively. By decreasing thus the thickness of the upper and the lower magnetic laminate films 6 and 2 at portions located in the vicinity of the magnetic gap G as compared with the other portions in this manner, improvement on the frequency characteristic of the read voltage in the read operation can be attained, while magnetic flux can be made more available in the write operation by increasing the thickness of the upper and the lower magnetic laminate films 6 and 2 except for the portions located in the vicinity of the magnetic gap G, to a further advantage.

Figure 6:
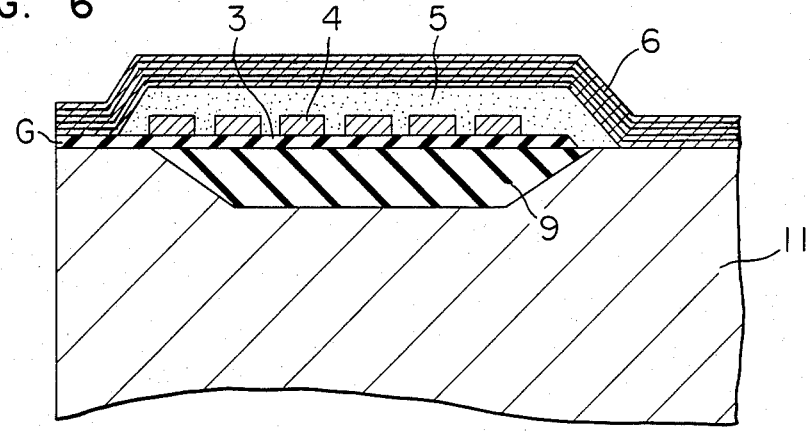
FIG. 6 shows in a schematic sectional view a still further embodiment of the thin film magnetic head according to the invention.

FIG. 6 shows still another embodiment of the thin magnetic head according to the present invention which differs from those described above in that the substrate 11 also serves as the lower magnetic film. Referring to this figure, a reference numeral 9 designates a non-magnetic portion which is formed adjacent to the major surface of the substrate 1 at an area corresponding to that of the coil conductor film 4 and destined to serve for preventing the magnetic flux from being leaked from the magnetic circuit at other portions than the magnetic gap G. With this structure of the thin film magnetic head, the processes for forming the thin layers for the lower magnetic film can be spared, whereby the manufacturing procedure is inexpensively simplified, to another advantage.

Figure 7:
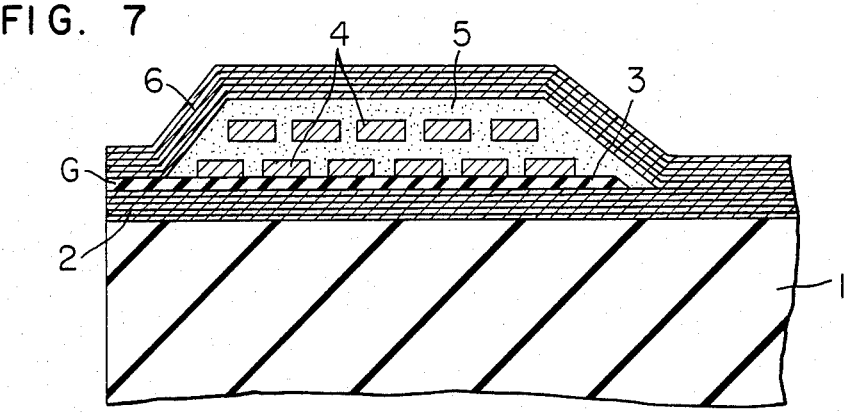
FIG. 7 shows in a schematic sectional view a further embodiment of the thin film magnetic head according to the invention.

FIG. 7 shows a further exemplary embodiment of the thin film magnetic head according to the present invention which differs from the preceding ones in that the coil conductor films 4 are disposed in a structure laminated in the direction thicknesswise of the upper magnetic film 6 with the insulating layer being interposed between the upper and the lower arrays of the coil conductor films. This structure is advantageous in that the intensity of the magnetic field produced by the head can be increased.

As will be appreciated from the foregoing description, the thin film magnetic head according to the present invention exhibits a high permeability and excellent magnetic characteristics by virtue of such structure that the magnetic film is constituted by the laminate structure of the alternately disposed magnetic thin film layers and non-magnetic thin film layers and that the second insulating layer is formed of a photo-sensitive material. Further, the second insulating layer can enjoy a high precision of pattern, involving remarkable reduction in the unevenness of the products in respects of the dimension and the characteristics as required.

Although the invention has been described in connection with the exemplary embodiments shown in FIGS. 2 to 7, it goes without saying that the invention is never restricted to those illustrative embodiments. Numerous variations and modifications will readily occur to those skilled in the art without departing from the spirit and scope of the invention.

We claim:

1. A thin film magnetic head, comprising:
   (a) a lower magnetic member;
   (b) an upper magnetic member stacked on said lower magnetic member and formed of laminate of magnetic thin film layers, each magnetic thin film layer having a thickness not higher than 0.8 $\mu$m, and non-magnetic thin film layers, each non-magnetic thin film layer having a thickness in a range of 20 Å to 0.04 $\mu$m, the magnetic and non-magnetic thin film layers being stacked alternately with each other and having one end portion disposed in opposition to one end portion of said lower magnetic member so as to define a magnetic gap therebetween and the other end portion brought into contact with the other end portion of said lower magnetic member so as to form a magnetic circuit in cooperation with said lower magnetic member;
   (c) a coil conductor film constituting a coil of a predetermined number of turns having a portion extending between said lower magnetic member and said upper magnetic member so as to intersect said magnetic circuit;
   (d) a first electrically insulating layer interposed between said lower magnetic member and said coil conductor film;
   (e) a second electrically insulating layer interposed between said upper magnetic member and said coil conductor film and formed of a photo-sensitive resin; and
   (f) a gap member disposed in said magnetic gap.

2. A thin film magnetic head according to claim 1, wherein each of the magnetic thin film layers constituting parts of said upper magnetic member exhibits uniaxial magnetic anisotropy.

3. A thin film magnetic head according to claim 1, wherein said coil conductor film comprises a plurality of subfilms spaced in the thickness direction, with an insulating layer being interposed between adjacent coil conductor subfilms.

4. A thin film magnetic head according to claim 1, wherein said lower magnetic member is formed by a laminate constituted by magnetic thin layers and non-magnetic thin film layers stacked alternately with each other.

5. A thin film magnetic head according to claim 4, wherein, each of the magnetic thin film layers of said layer magnetic member has a thickness not higher than about 0.8 μm, and each of the non-magnetic thin film layers of said lower magnetic member has a thickness in the range of 20 Å to 0.04 μm.

6. A thin film magnetic head according to claim 1, wherein said first insulating layer and said magnetic gap material are integrally formed of an electrically insulating inorganic material.

7. A thin film magnetic head according to claim 6, further including a third electrically insulating layer disposed between said first insulating layer and said coil conductor film, said third insulating layer being formed of an electrically insulating organic material.

8. A thin film magnetic head according to claim 6, wherein said lower magnetic member is formed by a laminate constituted by magnetic thin film layers and non-magnetic thin film layers stacked alternately with each other.

9. A thin film magnetic head according to claim 8, wherein each of the magnetic thin film layers of said lower magnetic member has a thickness not higher than about 0.8 μm, and each of the non-magnetic thin film layers of said lower magnetic member has a thickness in the range of 20 Å to 0.04 μm.

10. A thin film magnetic head according to claim 4 or 5, wherein said non-magnetic thin film layers of said lowr magnetic member is formed of an electrically insulating material.

11. A thin film magnetic head according to any one of claims 1, 2, 6 and 7, wherein said non-magnetic thin film layers of said upper magnetic member is formed of an electrically insulating material.

12. A thin film magnetic head according to claim 1, said lower magnetic member being composed of a laminate constituted by magnetic thin film layers and non-magnetic thin film layers stacked alternately with each other, wherein at least one of said lower magnetic member and said upper magnetic member is reduced in thickness at a portion located in the vicinity of said magnetic gap and increased in thickness at a portion distanced from said magnetic gap.

13. A thin film magnetic head according to claim 12, wherein each of the magnetic thin film layers of said lower magnetic member has a thickness not higher than about 0.8 μm, and each of the non-magnetic thin film layers of said lower magnetic member has a thickness in the range of 20 Å to 0.04 μm.

14. A thin film magnetic head according to claim 1, wherein said non-magnetic thin film layers are formed of at least one material selected from the group consisting of oxides other than $SiO_2$, nitrides and fluorides.

15. A thin film magnetic head according to claim 14, wherein said non-magnetic thin film layers are formed of at least one material selected from the group consisting of $Al_2O_3$, $Si_3N_4$ and $MgF_2$.

16. A thin film magnetic head according to claim 1, wherein said lower magnetic member is comprised of a single layer.

17. A thin film magnetic head according to claim 16, wherein said single layer is a substrate for said thin film magnetic head.

18. A thin film magnetic head according to claim 17, wherein said single layer includes a non-magnetic portion formed at an area of the surface of said single layer corresponding to said coil conductor.

* * * * *